United States Patent
Ozaki et al.

(10) Patent No.: US 8,078,600 B2
(45) Date of Patent: Dec. 13, 2011

(54) INFORMATION PROCESSING APPARATUS, CONTROL METHOD THEREOF, PROGRAM, AND STORAGE MEDIUM

(75) Inventors: Eriko Ozaki, Hachioji (JP); Hiroki Urashima, Tokyo (JP)

(73) Assignee: Canon Kabushiki Kaisha (JP)

( * ) Notice: Subject to any disclaimer, the term of this patent is extended or adjusted under 35 U.S.C. 154(b) by 264 days.

(21) Appl. No.: 11/762,372

(22) Filed: Jun. 13, 2007

(65) Prior Publication Data

US 2007/0294212 A1 Dec. 20, 2007

(30) Foreign Application Priority Data

Jun. 14, 2006 (JP) .................................. 2006-165063

(51) Int. Cl.
G06F 7/00 (2006.01)
G06F 17/30 (2006.01)
(52) U.S. Cl. ..................... 707/705; 348/211.6; 358/1.15
(58) Field of Classification Search .......................... None
See application file for complete search history.

(56) References Cited

U.S. PATENT DOCUMENTS

| | | | | |
|---|---|---|---|---|
| 6,125,408 | A * | 9/2000 | McGee et al. | 710/8 |
| 6,233,015 | B1 * | 5/2001 | Miller et al. | 348/333.05 |
| 6,697,105 | B1 * | 2/2004 | Kato et al. | 348/211.6 |
| 6,784,925 | B1 * | 8/2004 | Tomat et al. | 348/207.11 |
| 6,930,718 | B2 * | 8/2005 | Parulski et al. | 348/333.11 |
| 7,120,874 | B2 * | 10/2006 | Shah et al. | 715/733 |
| 7,595,833 | B2 * | 9/2009 | Calisa | 348/333.01 |
| 2001/0054088 | A1 * | 12/2001 | Naito et al. | 709/219 |
| 2003/0081145 | A1 * | 5/2003 | Seaman et al. | 348/460 |
| 2005/0267943 | A1 * | 12/2005 | Castaldi et al. | 709/206 |
| 2006/0143321 | A1 * | 6/2006 | Yoon | 710/8 |
| 2006/0170956 | A1 * | 8/2006 | Jung et al. | 358/1.15 |
| 2006/0265637 | A1 * | 11/2006 | Marriott et al. | 715/500.1 |
| 2006/0265661 | A1 * | 11/2006 | Ball | 715/734 |
| 2007/0101156 | A1 * | 5/2007 | Novoa et al. | 713/190 |

FOREIGN PATENT DOCUMENTS

| | | | |
|---|---|---|---|
| JP | 2001-273231 | A | 10/2001 |
| JP | 2003-030552 | A | 1/2003 |

* cited by examiner

*Primary Examiner* — Khanh Pham
*Assistant Examiner* — Azam Cheema
(74) *Attorney, Agent, or Firm* — Rossi, Kimms & McDowell LLP

(57) ABSTRACT

An information processing apparatus that can alleviate the stress of a user by clearly showing the acquisition status of contents data that is held by a peripheral device in a situation in which a plurality of devices are connected by a network. Contents data including metadata and image data that are held in the peripheral devices is acquired. A list of at least one of device data that represent the peripheral devices, the metadata, and the image data is displayed on the display unit in accordance with a stage of acquisition of the contents data by the contents data acquiring unit.

23 Claims, 10 Drawing Sheets

INFORMATION PROCESSING APPARATUS, CONTROL METHOD THEREOF, PROGRAM, AND STORAGE MEDIUM

BACKGROUND OF THE INVENTION

1. Field of the Invention

The present invention relates to an information processing apparatus and a control method thereof, a program, and a storage medium, and more particularly to an information processing apparatus that processes data that is input from peripheral devices, and a method therefor, as well as a program and a storage medium.

2. Description of the Related Art

In recent years the amount of data that can be stored and managed by personal computers has been increasing rapidly. Processing such as sorting or filtering is performed in order to retrieve desired data from amongst a large amount of data. In most cases such processing is performed using metadata that describes information concerning the relevant data. For example, the metadata includes a storage location of a file name or a file.

Further, GUIs (Graphical User Interfaces) that represent the contents of data in a form that is easy to comprehend visually by displaying the data contents in a contracted manner when a list of data is displayed are widely utilized for retrieving desired data. In particular, a reduced image called a thumbnail is used as a GUI when displaying a list of image or dynamic image data or the like.

However, since the data amount of thumbnail is large as it involves image information, in many cases time is required for acquiring thumbnails in comparison to acquiring text information such as metadata. Consequently, a method is known in which in order to reduce the stress of a user that arises while waiting for thumbnails to be displayed, one portion of metadata of the data to be displayed, for example, the file name, is displayed in advance. Thereafter, when a thumbnail is acquired the thumbnail is displayed for the first time.

By using thumbnails that visually represent the contents of data it is possible for a user to ascertain an overview of files displayed in a list. However, since the transfer rate between a client that displays the screen and a server that holds the data varies depending on the transmission line, it is difficult to display thumbnails at a fixed response speed. Therefore, a technique has been proposed that measures the transfer rate at the time of execution and changes the number of data items that are displayed depending on that transfer speed (for example, see Japanese Laid-Open Patent Publication (Kokai) No. 2001-273231).

Furthermore, to alleviate the stress of a user during processing, a technique has been proposed that explicitly shows the state of progress of processing when sending data to or receiving data from a server by displaying on a screen an image that is prepared for each procedure necessary for the sending or receiving (for example, see Japanese Laid-Open Patent Publication (Kokai) No. 2003-30552).

However, even by adopting a configuration in which only metadata is displayed prior to a thumbnail display, no metadata can be displayed in a device in which metadata acquisition is slow and thus the stress of the user cannot be alleviated.

Further, according to the above described prior art, since the number of thumbnail displays is reduced when the transfer speed is slow, all the contents data for which acquisition has been completed can not be displayed. Furthermore, even if the processing contents are displayed to alleviate the stress of a user, the display does not explicitly show which devices the data is being acquired from.

SUMMARY OF THE INVENTION

The present invention provides an information processing apparatus that can alleviate the stress of a user by clearly showing the acquisition status of contents data that is held by a peripheral device in a situation in which a plurality of devices are connected by a network, a control method of the information processing apparatus, a program, and a storage medium.

In a first aspect of the present invention, there is provided an information processing apparatus connected to a plurality of peripheral devices and having a display unit, comprising: a contents data acquiring unit adapted to acquire contents data including metadata and image data that are held in the peripheral devices; and a display control unit adapted to display on the display unit a list of at least one of device data that represent the peripheral devices, the metadata, and the image data, in accordance with a stage of acquisition of the contents data by the contents data acquiring unit.

The display control unit can comprise a device image list display control unit adapted to display a list of device data of a plurality of the peripheral devices that are connected to the information processing apparatus, on the display unit; and a metadata display control unit adapted to attach the metadata to the device data that are displayed, when acquisition of the metadata from the peripheral devices ends, and an image data display control unit adapted to add the image data to the metadata that is added, when acquisition of the image data from the peripheral devices ends.

When adding the metadata, the display control unit can display the metadata in association with the type of the peripheral device that holds the metadata on the display unit.

The display control unit can comprise a querying unit that queries the peripheral device regarding the status thereof, and a display switching unit adapted to switch a display form of a device image representing the peripheral device between a case in which the peripheral device can be used and a case in which the peripheral device cannot be used in accordance with a response result of the peripheral device with respect to the query of the querying unit.

The information processing apparatus can further comprise a device image specifying unit adapted to specify a specific device image among a plurality of devices images that are displayed in a list on the display unit, and a system resources control unit adapted to assign priority to a system resource that is effective for acquiring contents data that is held by a peripheral device corresponding to a device image that is specified by the device image specifying unit.

The information processing apparatus can further comprise an image data specifying unit adapted to specify specific image data among image data that is displayed on the display unit, and a system resources control unit adapted to assign priority to a system resource that is necessary for acquiring contents data held by a peripheral device corresponding to image data that is specified by the image data specifying unit.

The system resources control unit can control a frequency band for wireless communication.

The system resources control unit controls a CPU execution authority.

The system resources control unit controls a memory usage amount.

In a second aspect of the present invention, there is provided a control method of an information processing apparatus that is connected to a plurality of peripheral devices and has a display unit, the control method comprising: a contents data acquiring step of acquiring contents data including metadata and image data that are held in the peripheral devices;

and a display control step of displaying on the display unit a list of at least one of device data that represent the peripheral devices, the metadata, and the image data, in accordance with a stage of acquisition of the contents data in the contents data acquiring step.

In a third aspect of the present invention, there is provided a program for causing a computer to execute a control method of an information processing apparatus that is connected to a plurality of peripheral devices and has a display unit, the information processing apparatus control method comprising: a contents data acquiring step of acquiring contents data including metadata and image data, which are held in the peripheral devices; and a display control step of displaying on the display unit a list of at least one of device data that represent the peripheral devices, the metadata, and the image data, in accordance with a stage of acquisition of the contents data in the contents data acquiring step.

In a fourth aspect of the present invention, there is provided a computer-readable storage medium that stores the program.

With the above described configurations, it is possible to display a list of contents data in a state in which reduced images, metadata, and device data are mixed. Accordingly, the stress of a user can be alleviated by explicitly showing the acquisition status of contents data possessed by a peripheral device in a situation in which a plurality of devices are connected by a network.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the drawings.

Figure 1:
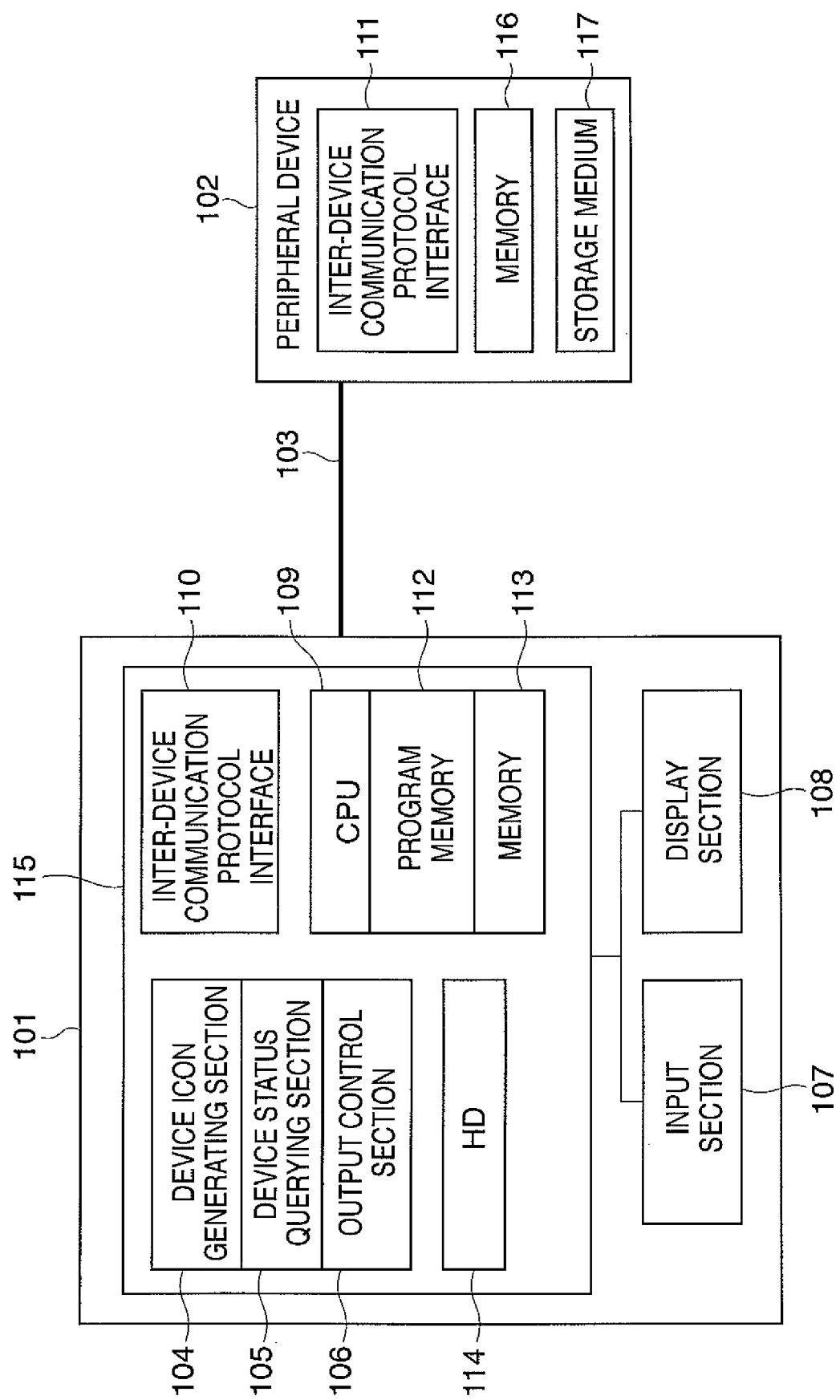
FIG. 1 is a block diagram schematically showing the configuration of an information processing apparatus according to an embodiment of the present invention.

FIG. 1 is a block diagram schematically showing the configuration of an information processing apparatus according to an embodiment of the present invention.

In FIG. 1, an information processing apparatus 101 such as a PC is connected to a peripheral device 102 through a network 103 by inter-device communication protocol interfaces 110 and 111. Data is sent and received between the information processing apparatus 101 and the peripheral device 102.

The information processing apparatus 101 includes an information processing section 115, and an input section 107, and a display section 108 connected to the information processing section 115. The information processing section 115 includes the inter-device communication protocol interface 110, a device icon generating section 104, a device status querying section 105, and an output control section 106. The information processing section 115 further includes a CPU 109, a program memory 112 that stores processing programs that are executed by the CPU 109, and a memory 113 that provides a work area at a time of processing by the CPU 109 and temporarily stores various kinds of data.

The peripheral device 102 is connected to the information processing apparatus 101. The peripheral device 102 has the inter-device communication protocol interface 111 and a memory 116 that stores device image data of the peripheral device 102. The peripheral device 102 is also configured with a storage medium 117 that stores contents data that includes metadata and reduced images. The memory 116 may also be configured to store contents data that includes metadata and reduced images.

The device icon generating section 104 creates a device image that corresponds to the peripheral device 102 using data that is received from the peripheral device 102. The device icon generating section 104 may associate a pre-registered device icon with the corresponding peripheral device 102, or a configuration may be adopted in which the user can create and register an arbitrary device icon that corresponds to the peripheral device 102.

The device status querying section 105 sends queries to the peripheral device 102 such as whether or not the power of the peripheral device 102 is turned on and whether or not the desired storage medium 117 is installed, through the inter-device communication protocol interface 110 and 111.

The output control section 106 performs control so as to display the device image of the peripheral device 102 and a list of reduced images and metadata that are stored in the storage medium 117 of the peripheral device 102 on the display section 108.

The input section 107 has a pointing device such as a mouse or keyboard, and is used to input various commands or data in accordance with a user operation.

The display section 108 has a display unit such as a CRT, liquid crystal, plasma, or SED display. The display section 108 displays icons or various images or characters based on image data that is output from the output control section 106.

The information processing section 115 also stores processing programs of the device status querying section 105, the output control section 106 and the inter-device communication protocol interface 110. As well as implementing the functions of those sections in accordance with the programs, the information processing section 115 also controls the input section 107 and the display section 108.

The functions of each of the sections 104 to 106 as described above are implemented by cooperation between the processing program and the CPU 109. The information processing section 115 further includes a hard disk 114 on which the processing programs are installed, and a configuration may also be adopted in which, when executing a processing program, the processing program is loaded from the hard disk 114 to the program memory 112 to be executed.

In this connection, although not particularly specified, the inter-device communication protocol interfaces 110 and 111 may be provided in any connection form as long as they can connect to the network 103 to perform exchanges between the information processing apparatus 101 and the peripheral device 102. Naturally, the network 103 may be a wireless or a wired network, and it is sufficient that the network 103 enables exchange of data between the information processing apparatus 101 and the peripheral device 102.

Although a case is described herein in which, to illustrate a simple example, only one information processing apparatus 101 and one peripheral device 102 are provided, a configuration may also be adopted in which a plurality of either or both thereof are connected to the network 103.

Figure 2:
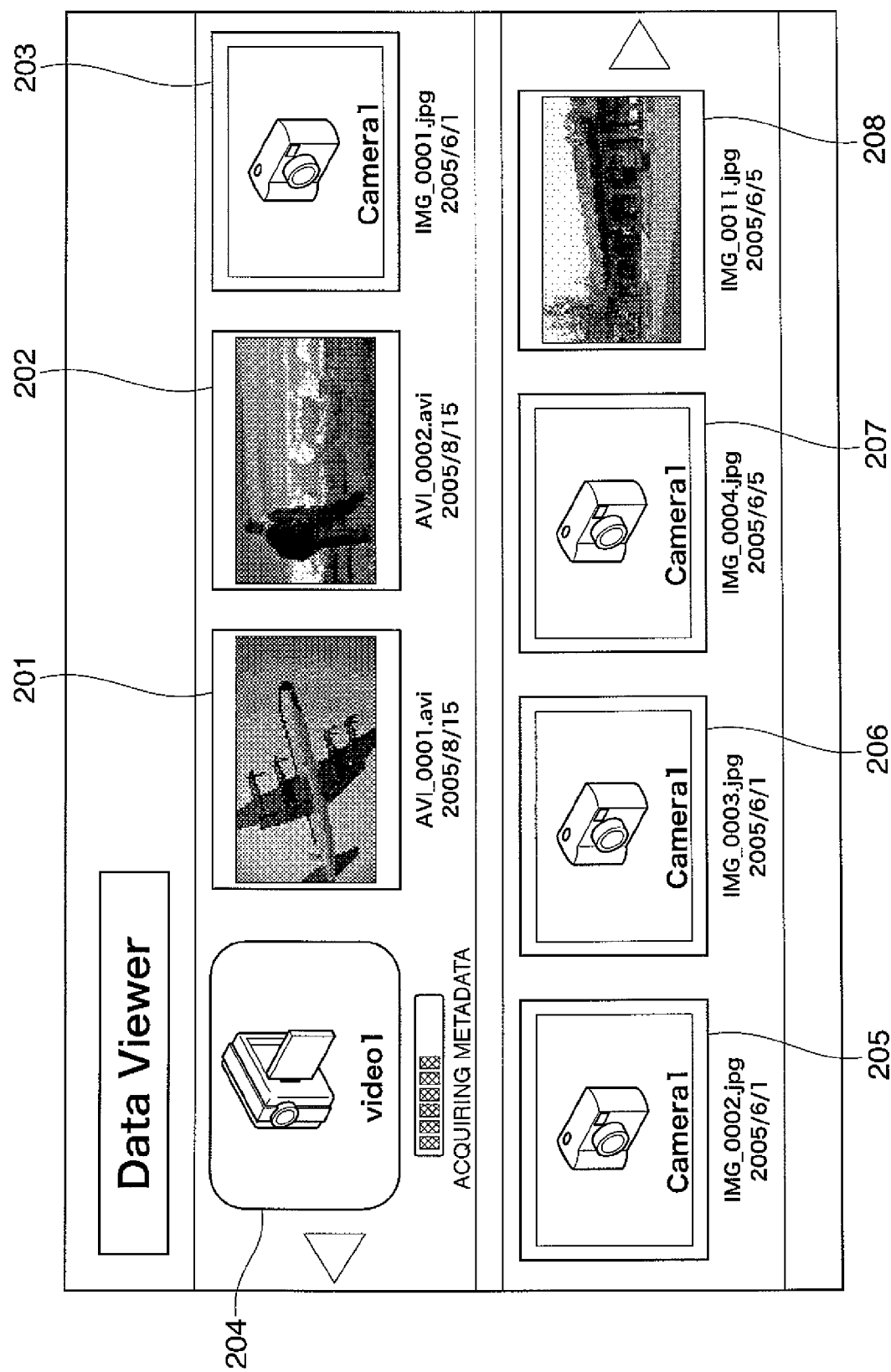
FIG. 2 is a view showing one example of images that are displayed on a display section by a GUI of the information processing apparatus shown in FIG. 1.

FIG. 2 is a view showing one example of images that are displayed on the display section by the GUI of the information processing apparatus shown in FIG. 1.

In FIG. 2, data relating to three peripheral devices is displayed as an example of a list display on a display screen. Reduced images 201, 202, and 208 are stored in the memory 116 or the storage medium 117 of each peripheral device 102.

A device icon (device image) 204 is an item that shows the peripheral device 102 during metadata acquisition, since neither metadata nor reduced images have yet been acquired. Device icons (device images)/metadata 203 and 205 to 207 are items that are stored in the memory 116 or the storage medium 117 of each peripheral device 102.

Reduced images 201, 202, and 208 are displayed for contents data possessed by a peripheral device for which both metadata acquisition and reduced image acquisition are performed quickly. The device icons/metadata 203 and 205 to 207 are displayed for contents data possessed by a peripheral device for which only metadata acquisition can be performed quickly.

In contrast, only the device icon 204 is displayed for a peripheral device for which both reduced image acquisition and metadata acquisition require time to perform.

As described above, in FIG. 2 a list of contents data is displayed in a state in which reduced images, metadata, and device images are mixed.

Figure 3:
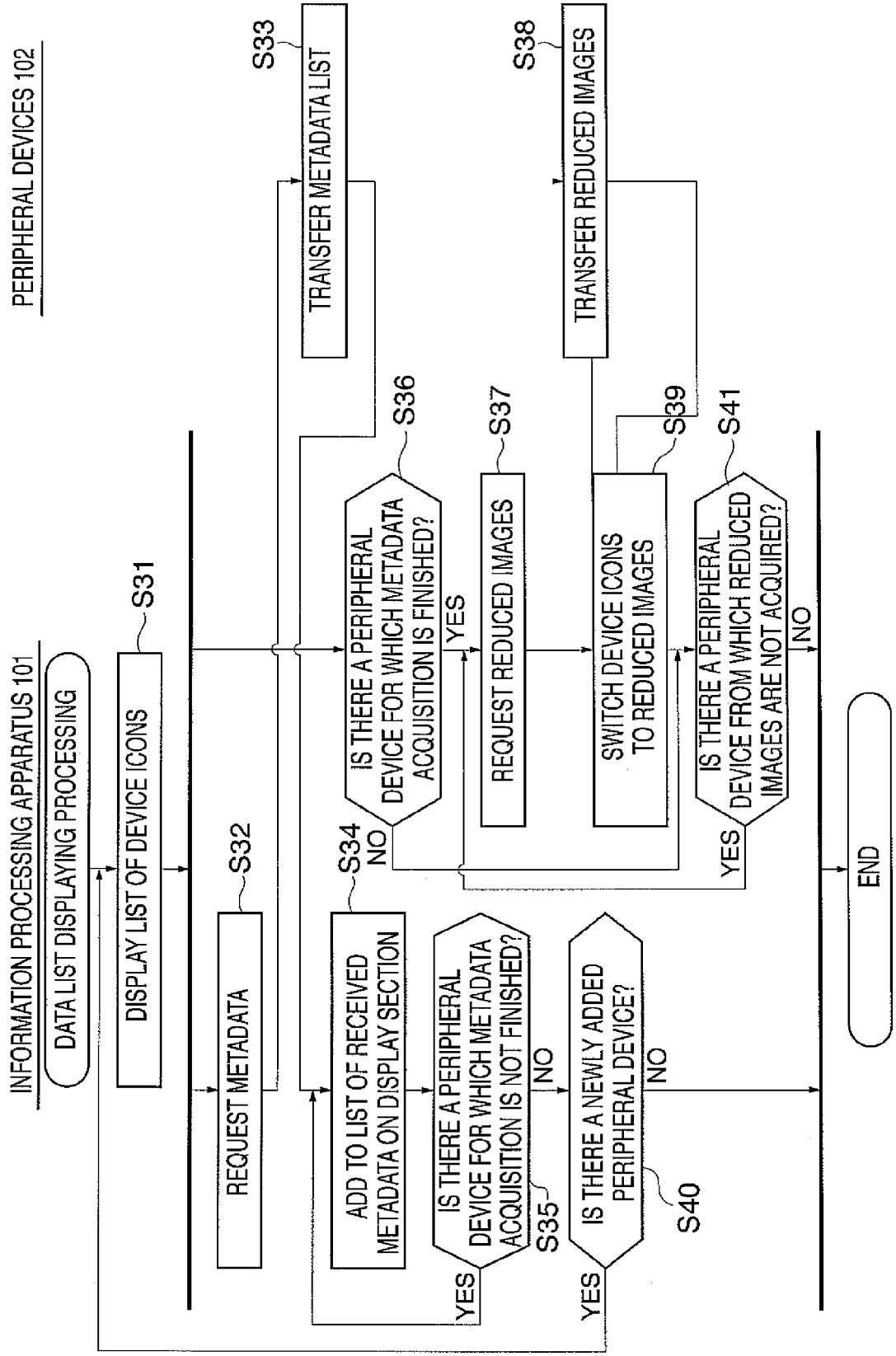
FIG. 3 is a flowchart showing the procedures of a contents data list displaying processing that is executed by a peripheral device and the information processing apparatus shown in FIG. 1.

FIG. 3 is a flowchart showing the procedures of a contents data list displaying processing that is executed by a peripheral device and the information processing apparatus shown in FIG. 1.

The program that executes this processing is stored in the program memory 112 of the information processing section 115, and is executed under the control of the CPU 109. This list display is activated when showing the search results obtained by a data search or when displaying a contents data playback list in a case where a contents data playback list is created.

In FIG. 3, first, a list of device icons (device images) of the peripheral devices 102 that are connected to the information processing apparatus 101 are displayed (step S31). In this case, an image icon is created using device icon data that the information processing apparatus 101 receives from a peripheral device 102 upon a peripheral device 102 being connected to the information processing apparatus 101. More specifically, the information processing apparatus 101 acquires the received device icon data each time a peripheral device 102 is newly added and connected to the information processing apparatus 101. Further, the information processing apparatus 101 can ascertain which peripheral devices 102 are currently connected by also detecting when a connected peripheral device 102 releases its connection to the information processing apparatus 101.

Next, the information processing apparatus 101 requests acquisition of metadata from all of the peripheral devices 102 that are connected (step S32). In response to this request, each peripheral device 102 transfers metadata (step S33).

Each time the information processing apparatus 101 receives metadata from a peripheral device 102, the information processing apparatus 101 additionally displays the received metadata in the device icon list. The processing of step S34 is then repeated each time the information processing apparatus 101 receives metadata that is transferred from a connected peripheral device 102.

The metadata transfer units are not particularly specified, and a transfer unit may be individual metadata, may be a list of all metadata for each peripheral device 102, or may be metadata of a suitable unit for each peripheral device 102. A configuration may also be adopted in which only a metadata acquisition request is sent, and metadata is displayed on the display section 108 each time metadata is received.

The processing in step S34 is then repeated until there is no longer a peripheral device 102 for which metadata acquisition is not completed (YES in step S35). Thus, even if metadata is added at an arbitrary peripheral device 102, the existence of the metadata can be immediately reflected at the information processing apparatus 101. A configuration may also be adopted in which reflection of dynamic data is realized even in a case in which processing is terminated once, by making it possible to return to the processing of step S34 and enabling reception of metadata when metadata is sent from the peripheral device 102.

When there is no longer a peripheral device 102 for which metadata acquisition is not completed (NO in step S35), the information processing apparatus 101 determines whether or not there is a peripheral device 102 that has been newly added since the metadata acquisition request was sent. If a newly added peripheral device 102 exists, the processing of step S31 and thereafter is repeated.

When there is no longer a newly added peripheral device 102 (NO in step S40), the information processing apparatus 101 ends the metadata acquisition processing. Further, a configuration may also be adopted in which, when a peripheral device 102 is newly added at the time of list display execution, of the processing of step S31 is always executed to be performed with respect to the peripheral device 102 to which metadata is added.

Further, concurrently with the metadata acquisition in steps S32 to S34, the information processing apparatus 101 determines whether or not peripheral devices 102 exist for which metadata acquisition has ended (step S36). If such peripheral devices 102 exist, the information processing apparatus 101 requests the relevant peripheral devices 102 to transfer reduced images (step S37).

Subsequently, the peripheral devices 102 transfer reduced images in response to the request at step S37 (step S38). When the information processing apparatus 101 receives a reduced image from each of the peripheral devices 102, it changes from displaying the relevant device icon to displaying the reduced image (step S39).

Next, the information processing apparatus 101 determines whether or not a peripheral device 102 from which reduced images have not been acquired exists (step S41). If such a peripheral device 102 exists, the information processing apparatus 101 repeats the processing from step S37 onward. When there are no longer any peripheral devices 102 from which reduced images have not been acquired (NO in step S41), the information processing apparatus 101 ends the reduced image acquisition processing. In step 41, although the information processing apparatus 101 determines whether or not a peripheral device 102 from which reduced images have not been acquired exists, a configuration may also be adopted in which the information processing apparatus 101 determines whether or not a peripheral device 102 for which reduced image transfer processing is not completed exists.

Although in the present example a request for metadata and a request for reduced image data are made in separate steps, the information processing apparatus 101 may request these two kinds of data at one time. In this case, the information processing apparatus 101 sends a data request one time to the peripheral devices 102. Thereafter, at the time of transfer of metadata from the peripheral devices 102 in response to this request the information processing apparatus 101 executes the processing of step S34, and at the time of transfer of reduced images the information processing apparatus 101 executes the processing of step S39.

Further, by storing data of a peripheral device that is received once in the memory 113 or the like, when executing a list display a second time the information processing apparatus 101 can perform display control by acquiring only the differential amount from the peripheral device in question.

Figure 4:
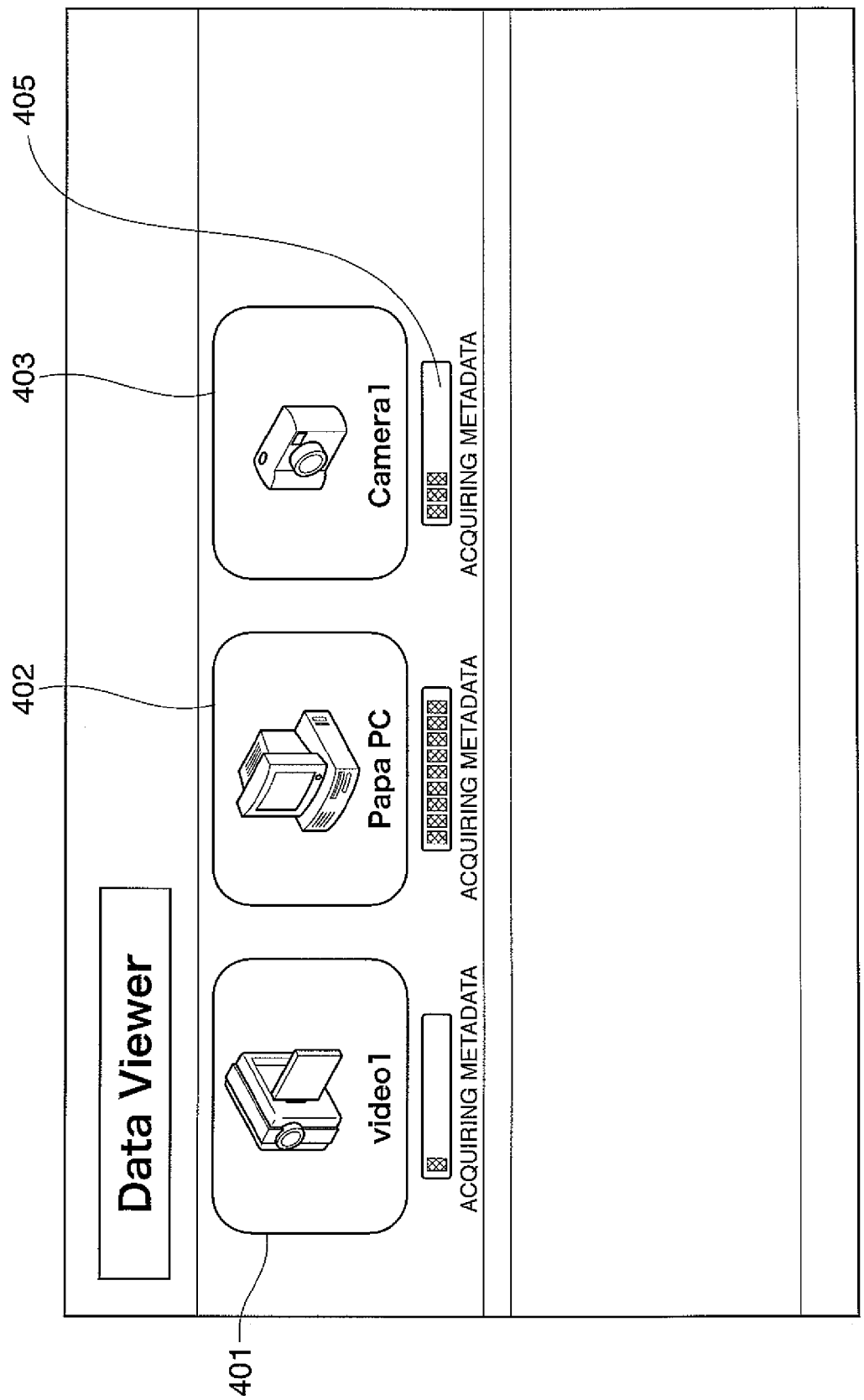
FIG. 4 is a view showing an example of images that are displayed on the display section by the GUI of the information processing apparatus at steps S31 and S32 shown in FIG. 3.

FIG. 4 is a view showing an example of images that are displayed on the display section by the GUI of the information processing apparatus in steps S31 and S32 shown in FIG. 3.

In step S31 and step S32 in FIG. 3, although the connected peripheral devices 102 are identified, the state is one in which the metadata of each peripheral device 102 is not acquired (the metadata is being acquired).

Hence, each of the peripheral devices 102 are displayed using the device icons 401 to 403. The device icon 401 illustrates an example of a case in which the name "video 1" is assigned by a user or by default for a connected digital video camera.

Further, as shown in the figure, by adding an image that can represent the progress status such as a progress status bar 405 to each of the device icons 401 to 403, it is possible to show how much of the metadata that is held by each peripheral device 102 has been transferred.

Figure 5:
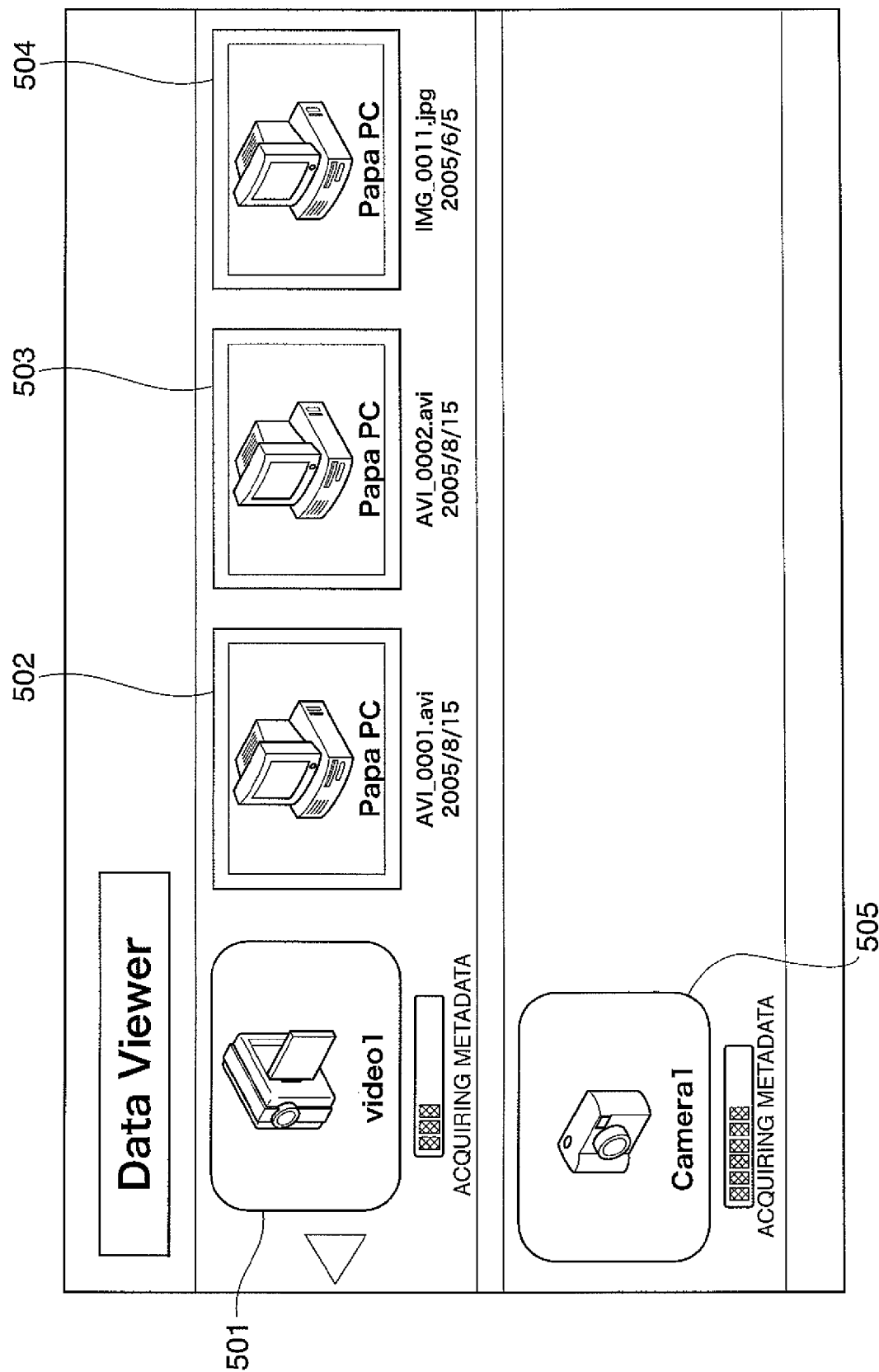
FIG. 5 is a view showing an example of images that are displayed on the display section by the GUI of the information processing apparatus in steps S34 to S36 shown in FIG. 3.

FIG. 5 is a view showing an example of images that are displayed on the display section by the GUI of the information processing apparatus in steps S34 to S36 shown in FIG. 3.

In steps S34 to S36 shown in FIG. 3, the state is one in which the connected peripheral devices 102 are identified and acquisition of metadata is complete for some of the peripheral devices 102 among all the peripheral devices 102. Hence, metadata 502 to 504 is displayed. Meanwhile, for the peripheral devices 102 for which metadata acquisition is not complete, similarly to the case illustrated in FIG. 4, the device icons 501 and 505 that represent the relevant peripheral devices 102 are displayed.

In the state shown in FIG. 5, since metadata has been acquired form the peripheral device "Papa PC" that is displayed as the device image 402 in FIG. 4, the contents data possessed by "Papa PC" is listed with metadata.

At this time, to make it easy for the user to understand that the metadata is the data of "Papa PC", for the metadata 502 and 503 a device icon is displayed together with the metadata instead of a reduced image. When acquisition of reduced images from "Papa PC" ends, and acquisition of metadata of the peripheral device "Camera 1" that is shown by the device icon 505 is completed, the display changes to the display shown in FIG. 2.

In FIG. 2, since metadata acquisition has not been completed for "video 1", metadata or a reduced image is not displayed, and "video 1" is represented by the device icon 204. In contrast, the reduced images 201, 202, and 208 are added to the contents data of "Papa PC". Further, since acquisition of the metadata of "Camera 1" is completed, the metadata 203 and 205 to 207 is displayed.

In this case, it is possible to align data for which acquisition of metadata is finished in order by utilizing metadata such as a file name or a date. Since FIG. 2 is an example in which the data is aligned in file name order, other files are aligned between the reduced images of "Papa PC" that had been all aligned next to each other prior to reception of the metadata of "Camera 1".

In FIG. 2, reduced images of "Camera 1" that come before the file "IMG_0011.jpg" that is contents data of "Papa PC" in alphabetical/numerical order are inserted before "IMG_0011.jpg".

As a result, even supposing that there are no reduced images of "Camera 1" if the user has a memory of viewing the file name list, it is easy for the user to imagine that reduced images will come between the reduced image 202 and the reduced image 208. In particular, when data is arranged in date order, even when contents data consists of only metadata with no reduced images it is possible to perform efficient retrieval since it is easy for the user to guess the data contents to some degree by inserting the metadata between reduced images.

According to the present embodiment, it is possible to the display list of the contents data possessed by the peripheral devices 102 that are connected to the information processing apparatus 101 in a form that is in accordance with the data acquisition status.

In this list, until reduced images possessed by the peripheral devices 102 are acquired, it is possible to display device images of the connected peripheral devices 102 or metadata of contents data held by each peripheral device 102.

Further, at the time of metadata display, it is also possible to display the type of the peripheral device 102 in association with the metadata. It is thereby possible to supply a GUI that has even greater convenience for the user.

Figure 6:
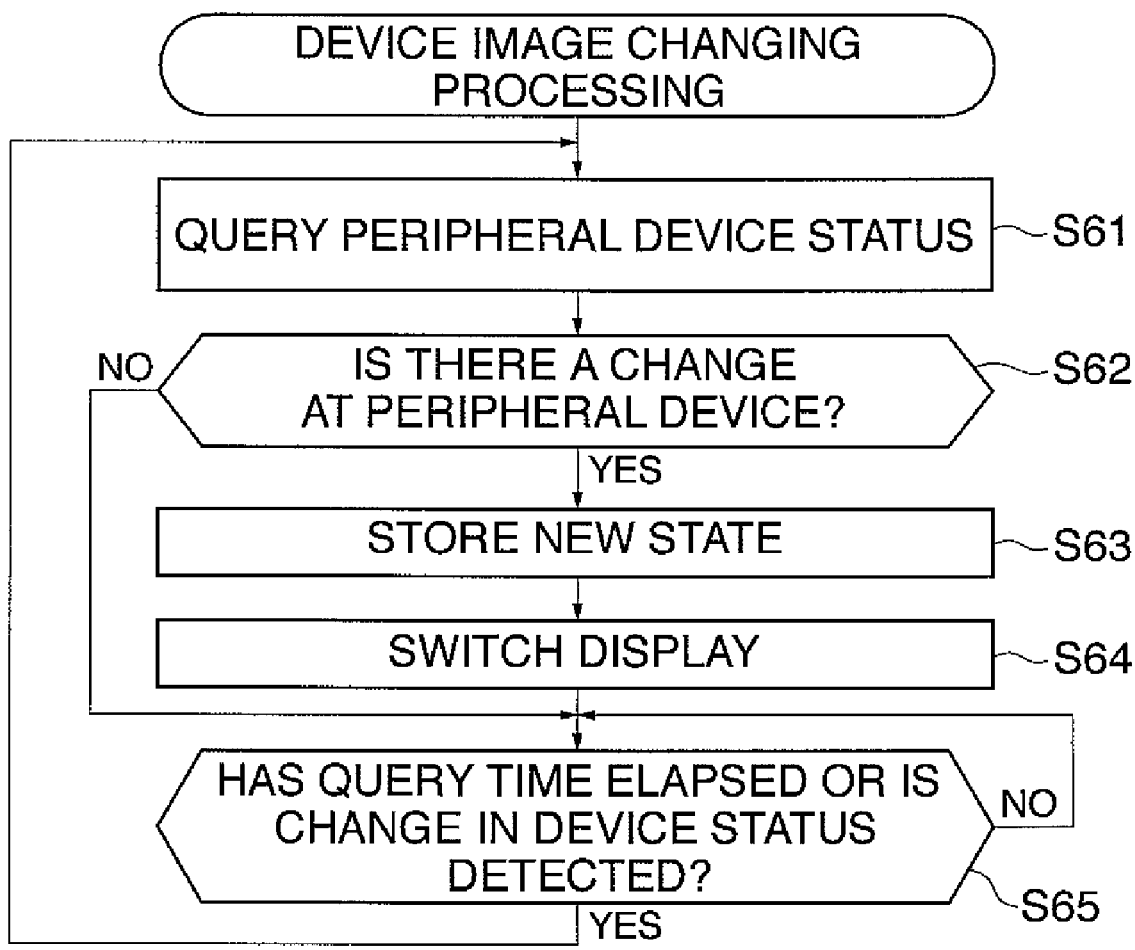
FIG. 6 is a flowchart showing the procedures of a device image changing processing that is executed by the information processing apparatus shown in FIG. 1.

FIG. 6 is a flowchart showing the procedures of a device image changing processing that is executed by the information processing apparatus shown in FIG. 1.

A program that executes this processing is stored in the program memory 112 of the information processing section 115, and is executed under the control of the CPU 109. According to this processing, the status of a peripheral device 102 is explicitly shown when displaying a device icon list.

In FIG. 6, first the device status querying section 105 is used to query the status of a peripheral device 102 (step S61). Next, the information processing apparatus 101 determines whether or not there is a change at the peripheral device 102, such as whether the queried result is not stored or whether there is a change from a stored state (step S62). When it is found as a result of the determination of step S62 that there is a change, the status of the queried peripheral device 102 is stored in the memory 113 or the like (step S63), and the device image is switched to conform to the changed state (step S64).

In this case, a device icon may be prepared for each state of a peripheral device 102 or, with respect to a single device icon, an icon or the like that displays only the status of the peripheral device 102 may be prepared and displayed in an overlapping manner for each status.

After switching the display at step S64, or when the result determined at step S62 is that there is no change, the information processing apparatus 101 determines whether or not a predetermined device status query time has elapsed or whether or not a change in the status of a peripheral device 102 is detected in a case where a peripheral device 102 is newly connected or where a connected peripheral device 102 is disconnected (step S65). When the information processing apparatus 101 detects a change in the status of a peripheral device 102 (YES in step S65), the information processing apparatus 101 repeats the processing of step S61 and onward.

In this connection, a change in the status of a peripheral device 102 at step S65 includes, in addition to a change in a device connection, the power of a device being turned on or off, and insertion of a storage medium into a peripheral device 102 or removal of an inserted storage medium therefrom. Information regarding a change in the status of a peripheral device 102 is exchanged by the inter-device communication protocol interfaces 110 and 111. UPnP (Universal Plug and Play) is used, for example, as the communication protocol. Connection or turning on of a peripheral device 102 is notified from the peripheral device 102 to the information processing apparatus 101.

Figure 7:
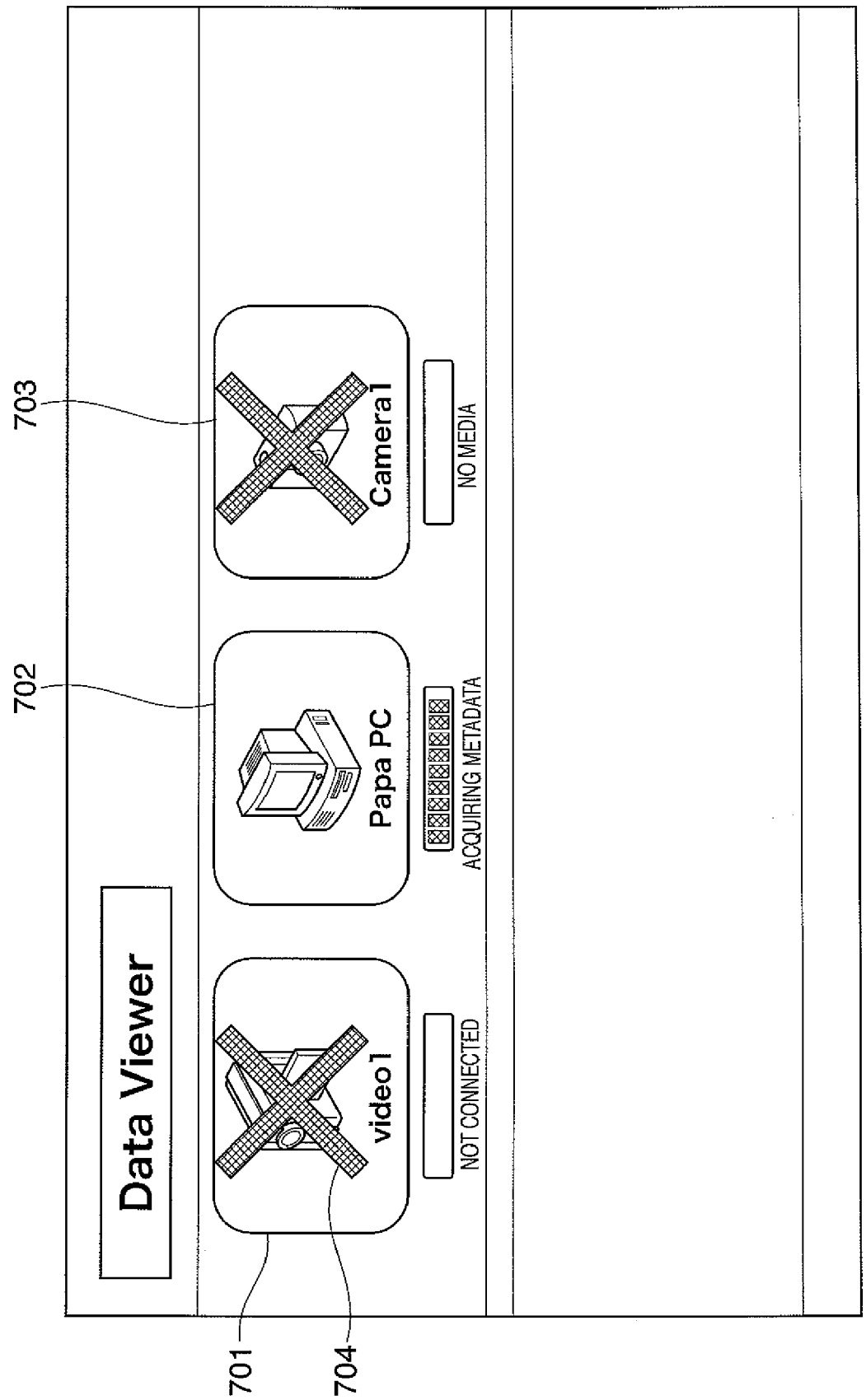
FIG. 7 is a view showing an example of device images of peripheral devices that are displayed on the display section by the GUI of the information processing apparatus shown in FIG. 1 before displaying a list of data possessed by the peripheral devices.

FIG. 7 is a view showing an example of device icons of peripheral devices 102 that are displayed by the GUI of the information processing apparatus shown in FIG. 1.

Device icons that are displayed on the display section 108 are switched according to the connection status of the peripheral device 102. For example, let us assume that the connection devices of the user are always as represented by the device icons 401 to 403 as shown in FIG. 4. In this example, the device icons are always displayed in this alignment, and when the data of a peripheral device 102 cannot be read for some reason, that fact is explicitly shown using a method other than a device icon.

There is shown in FIG. 7 shows a case in which, when peripheral devices 102 are connected as shown in FIG. 4, it is not possible to read data from the peripheral devices 102 of the device icons 701 and 703. In this case, a not possible mark 704 is superimposed on top of the device icons 701 and 703 without actually changing the device icons 701 to 703.

Further, in a case in which text data such as "acquiring metadata . . . " can be displayed, it is advantageous to display the reason that data of a peripheral device 102 can not be read, such as "not connected", with text data.

Since the connection has been disconnected for some reason, "not connected" is displayed with respect to the peripheral device 102 represented by the device icon 701. On the other hand, for the peripheral device 102 represented by the device icon 703, since a storage medium 117 that stores contents data is not mounted therein, "no media" is displayed.

In this case, images or text that are switched depending on the connection status may be of any type as long as it is possible to differentiate the connection status, such as only displaying an image in a grayed out state.

According to the present embodiment, since a device icon that is in accordance with a connection status of a peripheral device 102 that is connected to the information processing apparatus 101 is displayed at the same time as a list of the contents data, a user can easily determine whether or not contents data can be acquired from that peripheral device 102.

For example, when the display contents (order) of a device icon list changes because of a change in the connection state of a peripheral device 102, there is a possibility that the user will be confused since the position of the device icons that are always displayed changes. Hence, in a case where connecting peripheral devices 102 are in the same state for a fixed period or the like, as shown in the present embodiment it is preferable that the connected peripheral devices 102 are always displayed in the same manner and the connection status of the peripheral devices 102 is explicitly shown separately.

However, in this case, the alignment of the display of the peripheral devices 102 is not limited, and the present embodiment can also be utilized for a case in which peripheral devices 102 that can not be used due to the connection status of the peripheral devices 102 are organized together and displayed in alignment in a separate frame or the like. More specifically, there is the advantage that the peripheral devices 102 can be displayed in a manner that allows the user to know the state of the peripheral devices 102.

Figure 8:
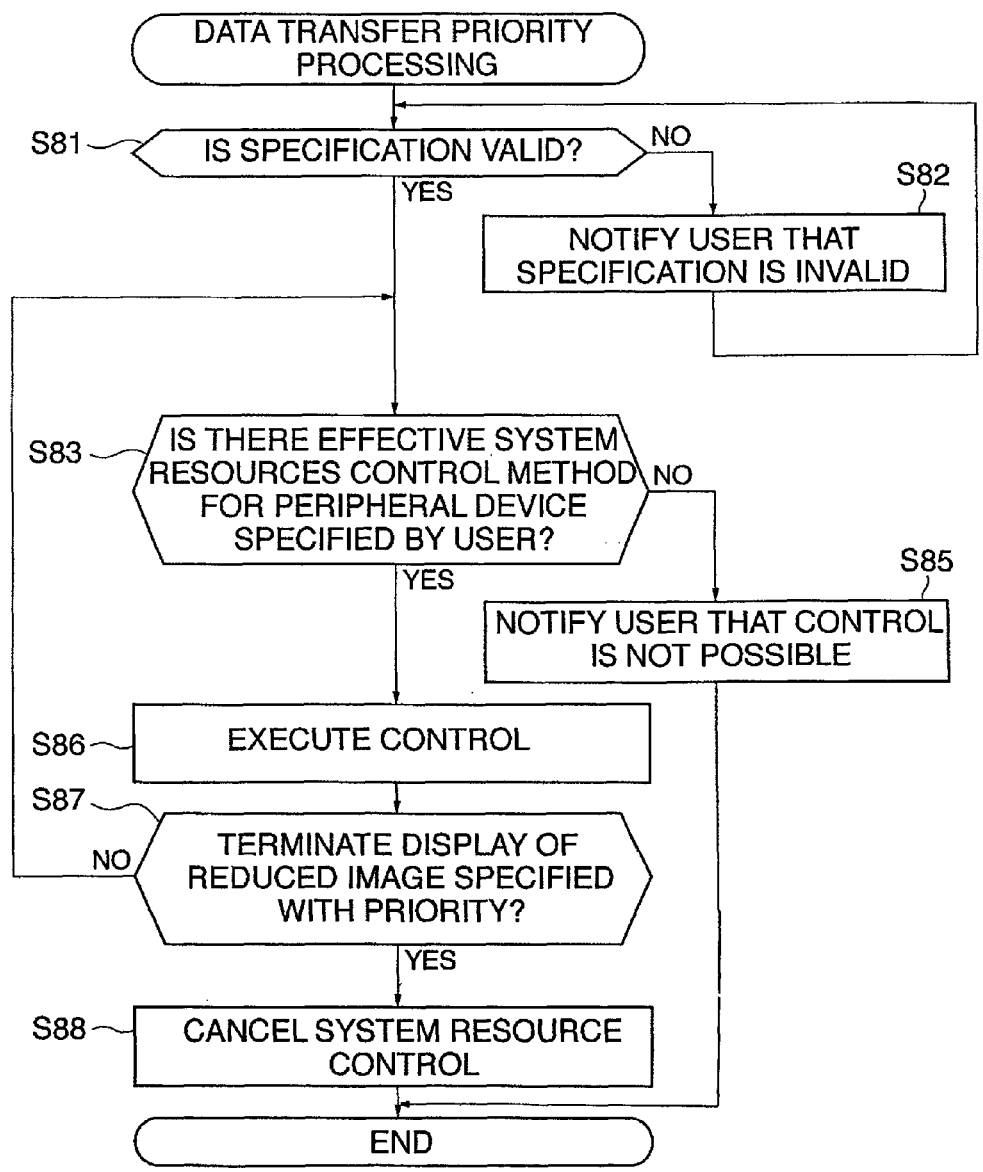
FIG. 8 is a flowchart showing the procedures of a data transfer priority processing that is executed by the information processing apparatus shown in FIG. 1.

FIG. 8 is a flowchart showing the procedure of data transfer priority processing that is executed by the information processing apparatus shown in FIG. 1.

A program that executes this processing is stored in the program memory 112 of the information processing section 115, and is executed under the control of the CPU 109. In this processing, system resource control is performed with respect to transfer of a device icon and contents data of a peripheral device 102 that is specified by a user.

As a system resource control method, first, band control in communication may be mentioned. QoS (Quality of Service) technology is used for band control to allocate a band to high priority communication and perform reliable communication. Furthermore, for example, band control technology such as packet classification, queue control, scheduling, and shaping in routing that performs control so that network packets are properly sent are also known as QoS technology.

In contrast, Intserv (Integrated Services) and Diffserv (Differentiated Services) are known as technologies that perform QoS control in which all devices that are connected to a network operate in a synchronized manner. In particular, by using Diffserv technology, a specified data can be given priority.

The priority of data transfers may also be controlled by the CPU 109 by controlling the program memory 112 or memory 113 or the like.

In any case, with respect to a desired peripheral device 102 of the user, it is sufficient that the information processing apparatus 101 gives priority to system resources that are required in order to acquire the data of that peripheral device 102 from the peripheral device 102, and a method is not limited to the methods described above.

Similarly, with respect to contents data desired by the user, it is sufficient that the information processing apparatus 101 gives priority to system resources that are required in order to acquire that contents data from the peripheral device 102, and a method is not limited to the methods described above.

According to the present embodiment, control of system resources for data transfers is performed according to the method that is determined to be the most effective at that time. However, the system resource control may be implemented by a method that combines a plurality of controls, a method that proceeds with a plurality of controls in a stepwise manner, or a method that always performs a plurality of controls in order or the like. Naturally, control may also be performed using a single method.

A configuration is adopted in which processing is started by a user specifying either a peripheral device 102 or contents data through the input section 107. Detection of a user specification is carried out by waiting for an input event using a GUI function or the like. For example, a configuration is adopted in which an event occurs when a device icon representing a peripheral device 102 that is displayed on the display section 108 or a reduced image that represents contents data is specified by a user through the input section 107.

Figure 9:
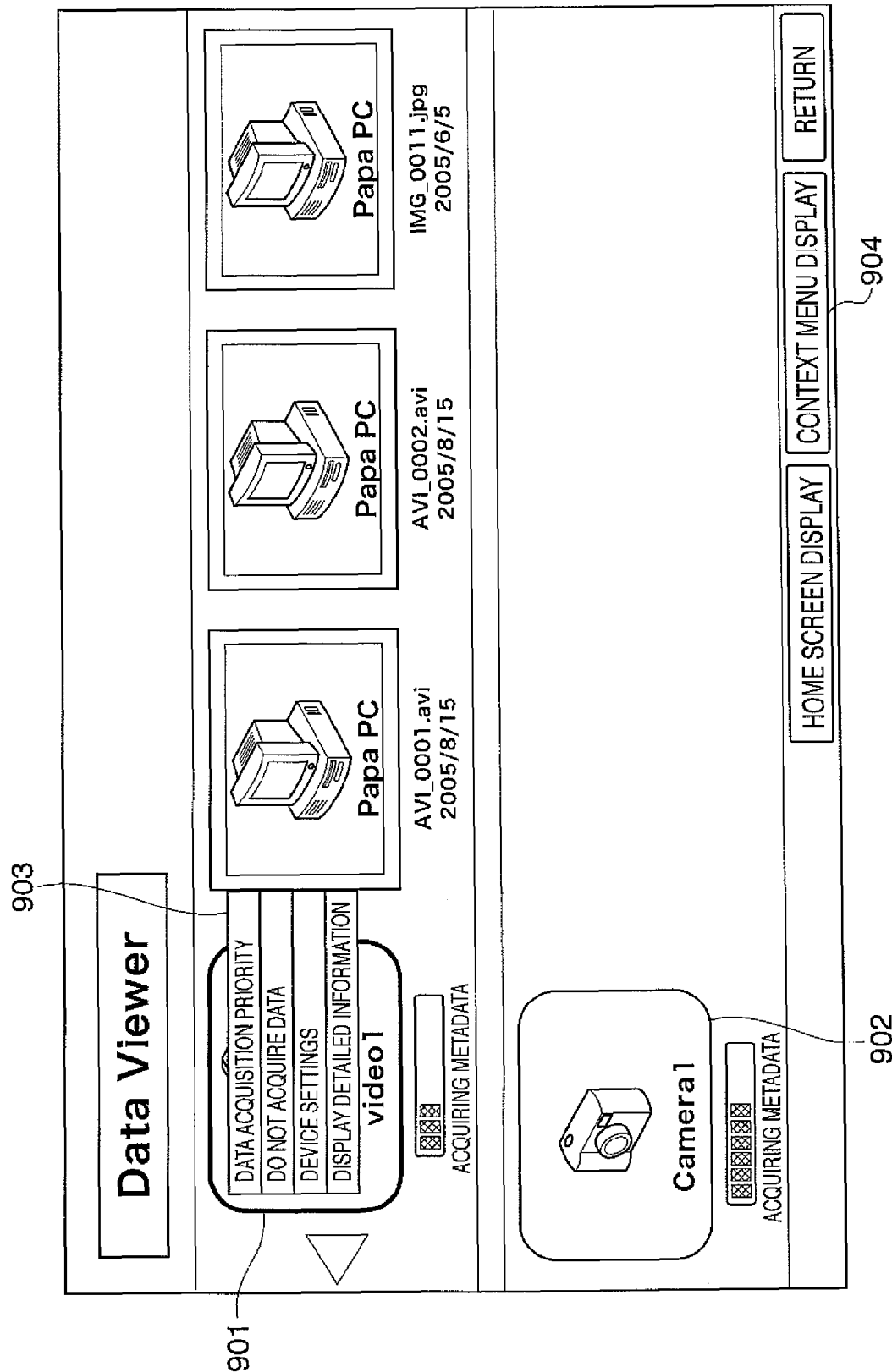
FIG. 9 is a view showing one example of images that are displayed on the display section by the GUI of the information processing apparatus shown in FIG. 1 when controlling the priority of data transfers with respect to peripheral devices.
Figure 10:
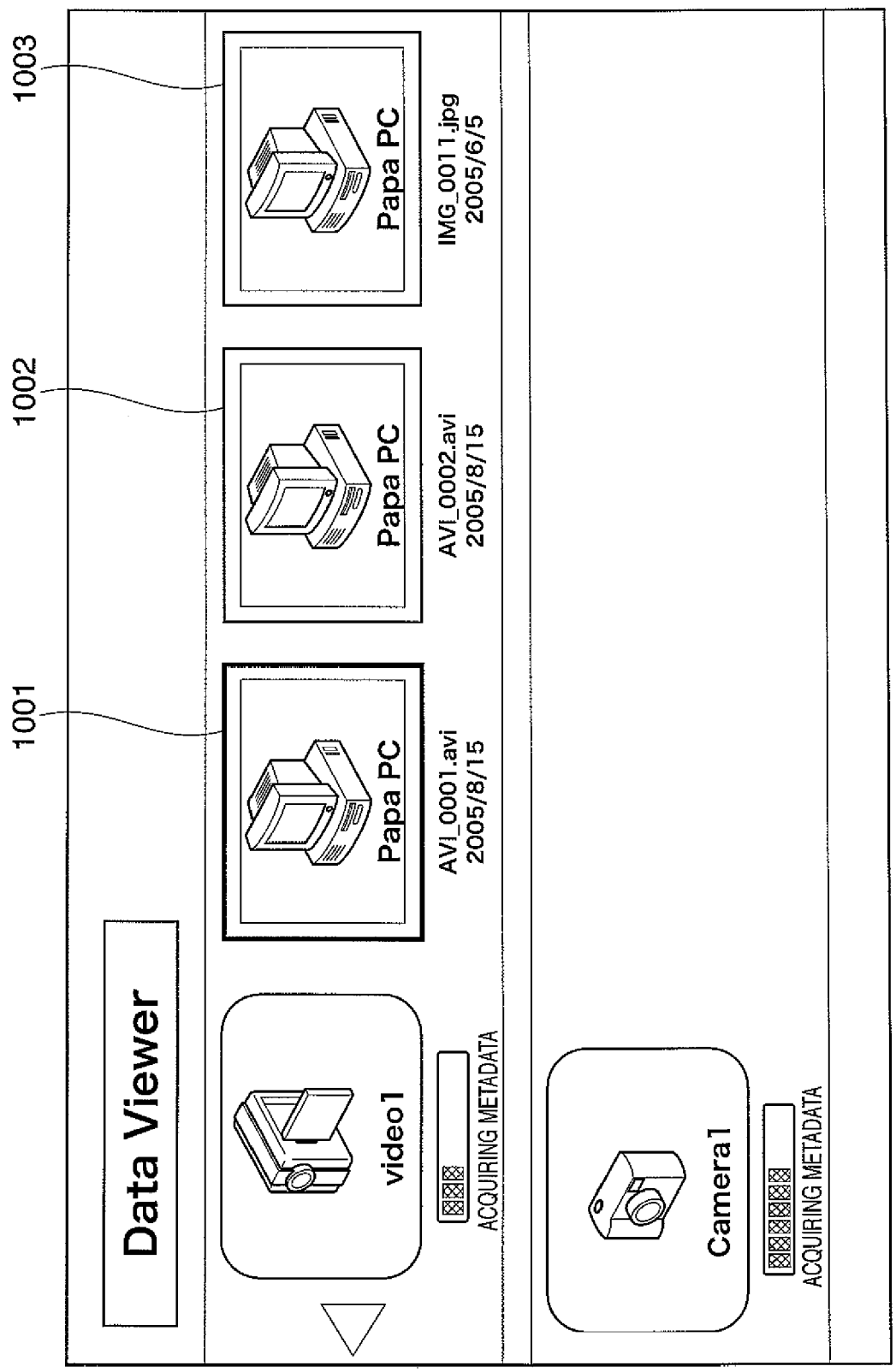
FIG. 10 is a view showing an example of images that are displayed on the display section by the GUI of the information processing apparatus shown in FIG. 1 when controlling the priority of data transfers with respect to contents data.

FIG. 9 and FIG. 10 are views each showing an example in which, a device icon or a reduced image on the GUI screen shown in FIG. 5 can be selected and specified.

In FIG. 9, by specifying inside a square specification frame 901 with rounded corners using the input section 107, a device "video 1" can be selected as a priority object for data acquisition. The specification frame 901 can be controlled with the input section 107, and can be distinguished from the device image 902.

As shown in FIG. 9, a state is entered in which a device icon is selected by the specification frame 901, and a data acquisition priority is specified. The specification method may be one in which a data acquisition priority button that is prepared in the input section 107 is pushed, or may be one in which a user can further select and decide a specification using a displayed operation menu.

A menu 903 can be displayed in a state in which a peripheral device 102 or data is selected. The user can execute display of the menu 903 by selecting a context menu button 904 prepared inside the GUI screen using the input section 107, or using a separately provided hard key on a keyboard or a remote controller.

When "data acquisition priority" inside the menu 903 is selected and specified by the input section 107, system resource control processing is executed. When the peripheral device 102 that is being selected is not connected or when acquisition of a reduced image with respect to contents data that is being selected is already completed, it is preferable that the data acquisition priority menu is not displayed, or that execution is disabled by disabling the selection.

As described above, by performing priority specification using the GUI, settings can be made so that resource control processing is started as the result of occurrence of a user specification event.

A priority for data acquisition can also be assigned to metadata, and not just to a peripheral device 102. In FIG. 10, by specifying the inside of a square frame 1001 using the input section 107, contents data "AVI_0001.avi" can be designated as a priority object for data acquisition. FIG. 10 shows a state in which metadata (and a device image) is selected by the frame 1001, and the metadata (and device images) 1002 and 1003 without a frame are in a non-selected state.

Although only three metadata are shown in this case, when performing acquisition of reduced images for a large amount of metadata a huge amount of resources are required. For that reason, metadata desired by the user is given priority over other metadata to enable acquisition of a reduced image.

In FIG. 8, first, when a data acquisition priority is specified, the information processing apparatus 101 determines whether or not the specification is valid (step S81). More specifically, during the specification the information processing apparatus 101 determines whether or not reduced image acquisition is terminated.

If the information processing apparatus 101 determines as the result at step S81 that the user specification is not valid, it notifies the user to the effect that the specification is invalid together with the cause (step S82). In contrast, when metadata acquisition or reduced image acquisition is not terminated and the user specification is valid, the information processing apparatus 101 determines whether or not there is a system resource control method that is effective with respect to the contents data or the peripheral device 102 that is specified by the user (step S83).

The information processing apparatus 101 makes a determination based on the communication status or memory usage situation at that time, and if there is a system resource control method that has already been performed the information processing apparatus 101 gives priority to a method other than that method. When it is found as the result of the determination at step S83 that there is no effective system resource control method, the information processing apparatus 101 notifies the user that it can not perform data acquisition priority control (step S85), followed by terminating the procedure.

When it is found as the result of the determination at step S83 that there is an effective system resource control method, the information processing apparatus 101 executes that effective system resource control method (step S86). Subsequently, after display of the reduced image that is specified with priority is terminated (YES at step S87), the information processing apparatus 101 cancels the system resource control (step S88), followed by terminating the procedure.

When the result of the determination at step S83 is that there is no effective system resource control method, the information processing apparatus 101 notifies the user that control is not possible (step S85), followed by terminating the procedure.

Cancellation of the resource control at step S88 is performed after determining whether or not the control should be cancelled in a case in which there is a resource control method that is being continuously performed from step S86.

Although prioritization of data acquisition is performed according to the present embodiment, a specification may also be made not to perform data acquisition. Making a setting not to acquire the data of a specified device by selecting "do not acquire data" in the menu 903 or the like allows the relevant resources to be directed for utilization in other processing.

Further, unless a specific peripheral device 102 is specified to acquire data, it is not necessary to display the contents data that is held by that peripheral device 102, and it is therefore possible to increase a display region that can display the data possessed by other peripheral devices.

According to the present embodiment a user can specify an acquisition priority for a specific peripheral device 102 that is connected to the information processing apparatus 101 or for specific contents data possessed by the peripheral device 102. It is therefore possible for the user to acquire only the desired contents data as quickly as possible.

According to the present embodiment it is possible to display a list of contents data possessed by peripheral devices that are connected to an information processing apparatus in a form that is in accordance with the acquisition status of the data.

Furthermore, since device icons in accordance with the connection status of the peripheral devices 102 connected to the information processing apparatus 101 can be displayed at the same time as the display list of the contents data, a user can easily determine whether or not contents data can be acquired from a peripheral device 102.

Further, since control can be performed so that a use can acquire only the desired contents data as quickly as possible, the convenience of the user can be further enhanced.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-165063 filed Jun. 14, 2006, which is hereby incorporated by reference herein in its entirety.

What is claimed is:

1. An information processing apparatus that is to be connected to a plurality of peripheral devices and to have a display unit, comprising:
   a contents data acquiring unit adapted to acquire a plurality of contents data including image data from the plurality of peripheral devices, respectively;
   a first display control unit adapted to allow the display unit to, before said contents data acquiring unit finishes acquiring the image data included in the contents data which is being acquired by the contents data acquiring unit, display a predetermined graphical image representing at least one of the plurality of peripheral devices corresponding to the contents data which is being acquired by the contents data acquiring unit, wherein the predetermined graphical image is acquired from a memory of the at least one peripheral device; and
   a second display control unit adapted to allow the display unit to, after said contents data acquiring unit has finished acquiring the image data included in the contents data which is being acquired by the contents data acquiring unit, display the acquired image data instead of the predetermined graphical image;
   wherein the contents data acquiring unit, the first display control unit, and the second display control unit are implemented, at least in part, by hardware components.

2. An information processing apparatus according to claim 1, wherein:
   said contents data includes metadata,
   said first display control unit is adapted to allow the display unit to, before said contents data acquiring unit finishes acquiring the metadata, display the predetermined image representing the at least one of the plurality of peripheral devices corresponding to the contents data which is being acquired by the contents data acquiring unit, and
   said second display control unit is adapted to allow the display unit, after said contents data acquiring unit has finished acquiring the metadata, display a plurality of the predetermined images.

3. An information processing apparatus according to claim 2, wherein said first display control unit allows the display unit to display the type of the peripheral device represented by the acquired metadata in association with the acquired metadata.

4. An information processing apparatus according to claim 1, wherein said contents data includes metadata, and
   said second display control unit is adapted to allow the display unit to, after said contents data acquiring unit has finished acquiring the metadata, display at least two of the predetermined image, the acquired metadata, and the acquired image data.

5. An information processing apparatus according to claim 4, wherein said second display control unit is adapted to allow the display unit to, after said contents data acquiring unit has finished acquiring the metadata, display the predetermined image and the acquired metadata.

6. An information processing apparatus according to claim 1, further comprising:
   a querying unit adapted to query the at least one of peripheral devices regarding the status thereof, wherein said first display control unit is adapted to allow the display unit to switch the predetermined image representing the at least one of the plurality of peripheral devices between a case in which the at least one of peripheral devices can be used and a case in which the at least one of peripheral devices cannot be used in accordance with a response result of the at least one of the plurality of peripheral devices with respect to the query of said querying device.

7. An information processing apparatus according to claim 1, further comprising:
   a predetermined image specifying unit adapted to specify a specific predetermined image among a plurality of predetermined images that are displayed in a list on the display unit, and
   a system resources control unit adapted to assign priority to a system resource that is effective for acquiring contents data that is held by a peripheral device corresponding to the specific predetermined image that is specified by said device image specifying unit.

8. An information processing apparatus according to claim 7, wherein said system resources control unit controls a frequency band for wireless communication.

9. An information processing apparatus according to claim 7, wherein said system resources control unit controls a CPU execution authority.

10. An information processing apparatus according to claim 7, wherein said system resources control unit controls a memory usage amount.

11. An information processing apparatus according to claim 1, further comprising:
- an image data specifying unit adapted to specify specific image data among image data that is displayed on said display unit, and
- a system resources control unit adapted to assign priority to a system resource that is necessary for acquiring contents data held by a peripheral device corresponding to image data that is specified by said image data specifying unit.

12. A method of processing information comprising the steps of:
- acquiring, by a contents data acquiring unit, a plurality of contents data, including image data, from a plurality of peripheral devices, respectively;
- allowing, by a first display control unit, a display unit to allow the display unit to, before said contents data acquiring unit finishes acquiring the image data, display a predetermined graphical image representing at least one of the plurality of peripheral devices corresponding to the contents data which is being acquired by the contents data acquiring unit, wherein the predetermined graphical image is acquired from a memory of the at least one peripheral device; and
- allowing, by a second display control unit, the display unit to, after said contents data acquiring unit has finished acquiring the image data, display the acquired image data instead of the predetermined graphical image.

13. A non-transitory computer-readable storage medium storing a program that, when executed by a computer, causes the computer to perform a method of processing information comprising the steps of:
- acquiring, by a contents data acquiring unit, a plurality of contents data, including image data, from a plurality of peripheral devices, respectively;
- allowing, by a first display control unit, a display unit to allow the display unit to, before said contents data acquiring unit finishes acquiring the image data, display a predetermined graphical image representing at least one of the plurality of peripheral devices corresponding to the contents data which is being acquired by the contents data acquiring unit, wherein the predetermined graphical image is acquired from a memory of the at least one peripheral device; and
- allowing, by a second display control unit, the display unit to, after said contents data acquiring unit has finished acquiring the image data, display the acquired image data instead of the predetermined graphical image.

14. An information processing apparatus that is to be connected to a plurality of peripheral devices and having a display unit, comprising:
- a contents data acquiring unit adapted to acquire a plurality of contents data including metadata and image data from the plurality of peripheral devices, respectively;
- a device image list control unit adapted to display a list of graphical device images of at least one of the plurality of peripheral devices, wherein the graphical devices images in the list are acquired from a memory of the at least one peripheral device;
- a metadata display control unit adapted to add the metadata to the graphical device images that are displayed, when said contents data acquiring unit finishes acquiring the metadata from the at least one of the peripheral devices; and
- an image data display control unit adapted to allow the display unit, after said contents data acquiring unit has finished acquiring the image data included in the contents data which is being acquired by the contents data acquiring unit, display the acquired image data instead of the graphical device images;
- wherein the contents data acquiring unit, the device image list control unit, the metadata display control unit, and the image data display control unit are implemented, at least in part, by hardware components.

15. An information processing apparatus according to claim 14, wherein said metadata display control unit allows the display unit to display the type of the peripheral device represented by the acquired metadata in association with the acquired metadata.

16. An information processing apparatus according to claim 14, further comprising a querying unit adapted to query the at least one of peripheral devices regarding the statues thereof, wherein
- said first display control unit is adapted to allow the display unit to switch the predetermined image representing the at least one of the plurality of peripheral devices between a case in which the at least one of peripheral devices can be used and a case in which the at least one of peripheral devices cannot be used in accordance with a response result of the at least one of the plurality of peripheral devices with respect to the query of said query device.

17. An information processing apparatus according to claim 14, further comprising:
- a device image specifying unit adapted to specify a specific predetermined image among a plurality of device images that are displayed in a list on the display unit, and
- a system resources control unit adapted to assign priority to a system resource that is effective for acquiring contents data that is held by a peripheral device corresponding to the specific device image that is specified by said device image specifying unit.

18. An information processing apparatus according to claim 17, wherein said system resources control unit controls a frequency band for wireless communication.

19. An information processing apparatus according to claim 17, wherein said system resources control unit controls a CPU execution authority.

20. An information processing apparatus according to claim 17, wherein said system resources control unit controls a memory usage amount.

21. An information processing apparatus according to claim 14, further comprising:
- an image data specifying unit adapted to specify specific image data among image data that is displayed on said display unit, and
- a system resources control unit adapted to assign priority to a system resource that is necessary for acquiring contents data held by a peripheral device corresponding to the specific image data that is specified by said image data specifying unit.

22. A method for processing information comprising the steps of:
- acquiring, by a contents data acquiring unit, a plurality of contents data including metadata and image data from a plurality of peripheral devices, respectively;
- displaying, by a device image list control unit, a list of graphical device images of at least one of the plurality of peripheral devices, wherein the graphical device images in the list are acquired from a memory of the at least one peripheral device;
- adding metadata, by a metadata display control unit, to the graphical device images that are displayed, when said contents data acquiring unit finishes acquiring the metadata from the at least one of the peripheral devices; and allowing, by an image data display control unit, the display unit to, after said contents data acquiring unit has finished acquiring the image data included in the contents data which is being acquired by the contents data acquiring unit, display the acquired image data instead of the graphical device image.

23. A non-transitory computer-readable storage medium storing a program that, when executed by a computer, causes the computer to perform a method of processing information comprising the steps of:
   acquiring, by a contents data acquiring unit, a plurality of contents data including metadata and image data from a plurality of peripheral devices, respectively;
   displaying, by a device image list control unit, a list of graphical device images of at least one of the plurality of peripheral devices, wherein the graphical device images in the list are acquired from a memory of the at least one peripheral device;
   adding metadata, by a metadata display control unit, to the device images that are displayed, when said contents data acquiring unit finishes acquiring the metadata from the at least one of the peripheral devices; and
   allowing, by an image data display control unit, the display unit to, after said contents data acquiring unit has finished acquiring the image data included in the contents data which is being acquired by the contents data acquiring unit, display the acquired image data instead of the graphical device image.

* * * * *